United States Patent [19]

Ito et al.

[11] Patent Number: 4,973,815
[45] Date of Patent: Nov. 27, 1990

[54] RESISTANCE WELDER USING AN INVERTER

[75] Inventors: Kazutaka Ito, Gifu; Akinori Ito, Nagoya, both of Japan

[73] Assignee: Kabushiki Kaisha Nagoya Dengensha, Nagoya, Japan

[21] Appl. No.: 430,301

[22] Filed: Nov. 2, 1989

[51] Int. Cl.$^5$ .............................................. B23K 11/24
[52] U.S. Cl. .................................................. 219/110
[58] Field of Search ................................ 219/108, 110

[56] References Cited

U.S. PATENT DOCUMENTS 4,721,841  1/1988  Pazzaglia et al. ................... 219/110
4,868,364  9/1989  Kawano et al. ..................... 219/110

*Primary Examiner*—Clifford C. Shaw
*Attorney, Agent, or Firm*—Dennison, Meserole, Pollack & Scheiner

[57] ABSTRACT

A dc resistance welder includes a first rectifier circuit for converting the ac power from an ac power supply into dc power, an inverter for converting the dc power into ac power having a desired frequency, a welding transformer connected to the inverter, a second rectifier circuit for rectifying the output current of the welding transformer and for supplying welding current to a workpiece, a first element for setting welding current in accordance with the nature of the workpiece, a second element for sensing actual welding current for the purpose of sensing magnetic saturation of the welding transformer, and a third element for comparing the welding sent by the first element with the actual welding current sensed by the second element and for varying the output frequency of the inverter by inverting the direction of the output current of the inverter when the actual welding current reaches the set welding current.

2 Claims, 5 Drawing Sheets

RESISTANCE WELDER USING AN INVERTER

BACKGROUND OF THE INVENTION

The present invention relates to improvements in a dc resistance welder using an inverter.

Conventionally, in inverter type dc resistance welders, the welding current is controlled by a pulse-width modulation (PWM) system. Specifically, the welding current is set to a fixed value depending on the shape of workpieces to be welded and the type of welding guns to be used, and is controlled by an inverter having a fixed frequency determined by a priority condition in which the weight of a welding transformer is minimized on the basis of the fixed welding current. Since the frequency of the inverter is fixed, it is not difficult to design a lightweight welding transformer for performing a welding operation at a fixed welding current. However, in general, a wide variety of workpieces are welded by a single welding machine and thence, various types of welding guns are available to suit the various kinds of workpieces. Thus, there has been a technical limitation in obtaining satisfactory weld quality with a fixed welding current.

For this reason, therefore, when the welding current is varied, new welding transformers have to be designed based on the frequency of the inverter. In such a case, the intended priority condition to minimize the weight of the transformers is no longer maintained, making it difficult to design smaller size transformers.

Further, in the conventional PWM method where the operating frequency of the inverter is fixed, the operating frequency has to be set at a relatively high frequency so as to provide a smaller size welding transformer. As a consequence, the welding current is restrained by the frequency characteristics of the welding transformer and the circuit conditions such as the power cable extending from the power supply to the transformer and the inherent impedance of the transformer. Thus, the welding current can not be passed to the maximum value allowed by design specifications.

SUMMARY OF THE INVENTION

It is, accordingly, an object of the present invention to provide an inverter type dc resistance welder in which the frequency of the inverter may be varied while maintaining the possible minimum weight of the welding transformer so that the welding current is adjustable to the extent that the welding transformer is not magnetically saturated.

According to the present invention, there is provided a dc resistance welder which comprises a first rectifier circuit for converting the ac power from an ac power supply into dc power, an inverter for converting the dc power into ac power having a desired frequency, a welding transformer connected to the inverter, a second rectifier circuit for rectifying the output current of the welding transformer and for supplying welding current to a workpiece, first means for setting welding current in accordance with the nature of the workpiece, second means for sensing actual welding current for the purpose of sensing magnetic saturation of the welding transformer, and third means for comparing the welding current set by the first means with the actual welding current sensed by the second means and for varying the output frequency of the inverter by inverting the direction of the output current of the inverter when the actual welding current reaches the set welding current.

In a preferred embodiment, when the welding current set by the first means is large, the time until which the actual welding current reaches the set welding current becomes longer due to impedance of the workpiece, and consequently, the output frequency of the inverter becomes correspondingly lower. Therefore, a large amount of current may be applied to the workpiece without magnetically saturating the welding transformer. On the other hand, when the set welding current Ia is small, the time until which the actual welding current reaches the set welding current becomes shorter, and consequently, the output frequency of the inverter becomes correspondingly higher. Therefore, even a small amount of current may be applied to the workpiece, using the welding transformer efficiently in close proximity to magnetic saturation.

The second means senses whether the welding transformer is magnetically saturated by sensing the exciting current which increases rapidly when the welding transformer is magnetically saturated, so that no further variation in the operating frequency of the inverter may be made. Thus, either a large or a small amount of welding current may effectively be supplied to the workpiece, with the output current of the inverter in a stable condition.

The present invention will become more fully apparent from the claims and description as it proceeds in connection with the drawings.

DETAILED DESCRIPTION OF THE PREFERRED EMBODIMENT

Figure 1:
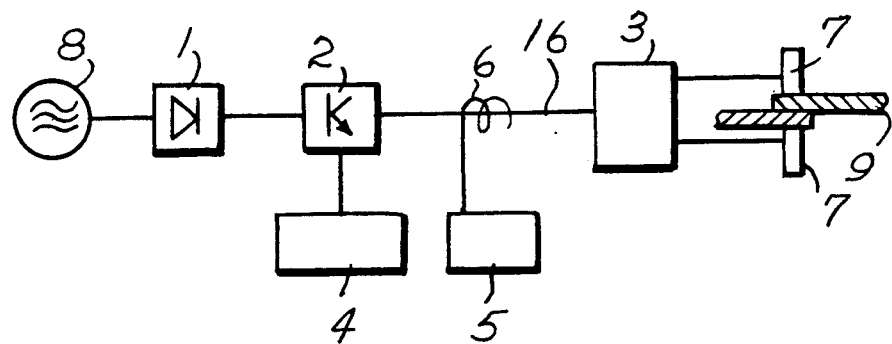
FIG. 1 is a block diagram of an inverter type dc resistance welder of the present invention.

Referring first to FIG. 1, there is shown in block diagram a dc resistance welder of the present invention. As shown therein, the welder includes a rectifier circuit 1, an inverter 2, a welding transformer 3, a main control unit 4, a magnetic saturation sensing circuit 5, a current sensor 6, and welding guns 7. The welder is energized by a commercial ac power supply 8 for welding a workpiece 9.

Figure 2:
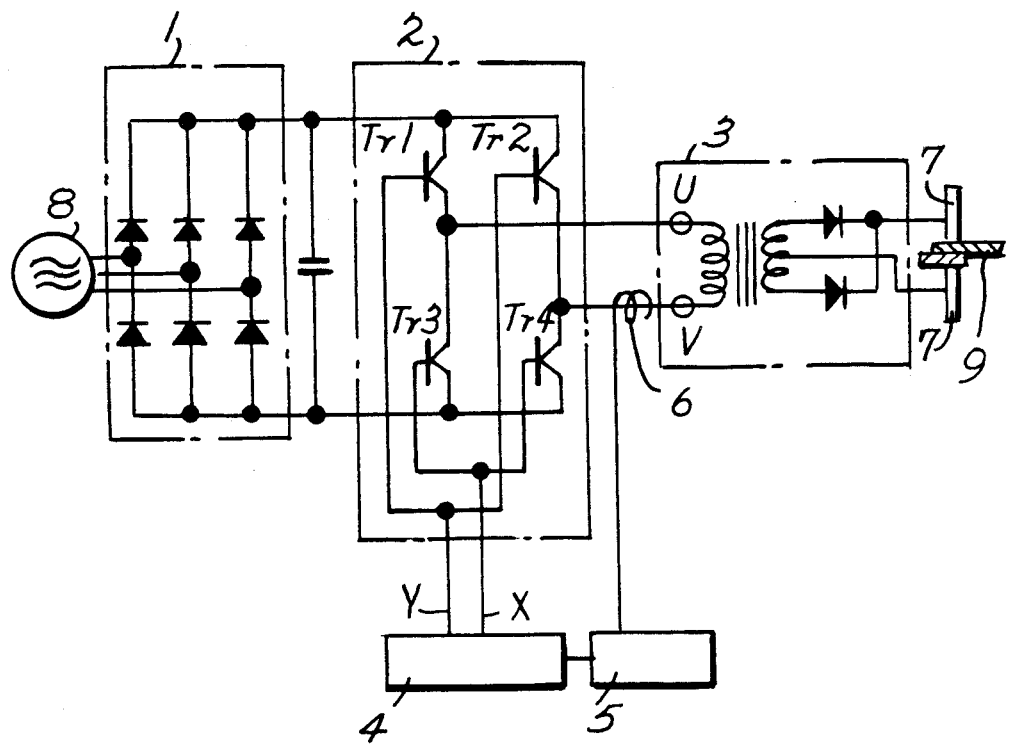
FIG. 2 is an electrical schematic diagram showing the main circuit of the welder.

Referring next to FIG. 2, there is shown an electrical schematic diagram showing the main circuit of the welder which is comprised of the rectifier circuit 1, the inverter 2 and the welding transformer 3. Specifically, the rectifier circuit 1 includes a 3-phase full-wave rectifier which rectifies ac power supplied by the power supply 8. The inverter 2 is a power inverter including bridge-connected transistors Tr1, Tr2, Tr3 and Tr4. The welding transformer 3 is a transformer having a secondary coil connected to a rectifier to supply dc welding current to the guns 7.

Figure 3:
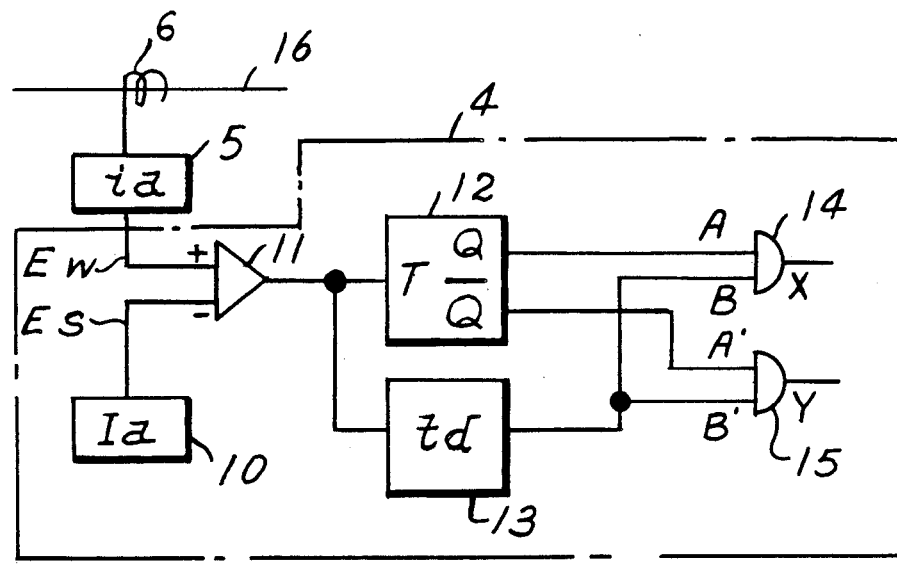
FIG. 3 is a block diagram showing the control circuit of the welder.

Referring next to FIG. 3, there is shown a block diagram showing the control circuit of the welder which is comprised of the main control unit 4, the magnetic saturation sensing circuit 5 and the current sensor 6. Specifically, the main control unit 4 includes a welding current setting device 10, a comparator 11, a T-type flip-flop 12, a turn-on and turn-off time setting circuit 13, and AND gates 14 and 15. The current sensor 6 is wound around a primary welding current conductor 16 which connects an output terminal of the inverter 2 to an input terminal of the primary coil of the welding transformer 3.

Figure 4:
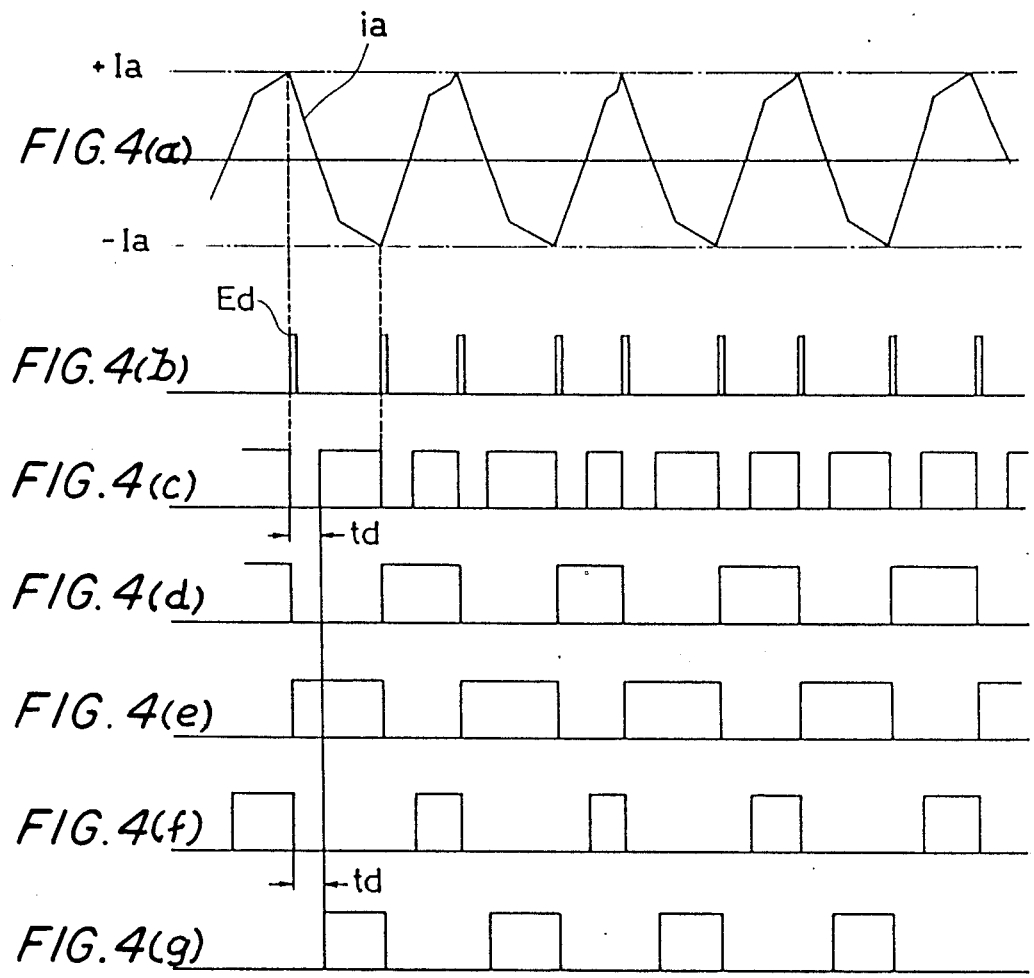
FIGS. 4a–4g are schematic diagrams showing the operation of the control circuit when the set welding current is large.
Figure 5:
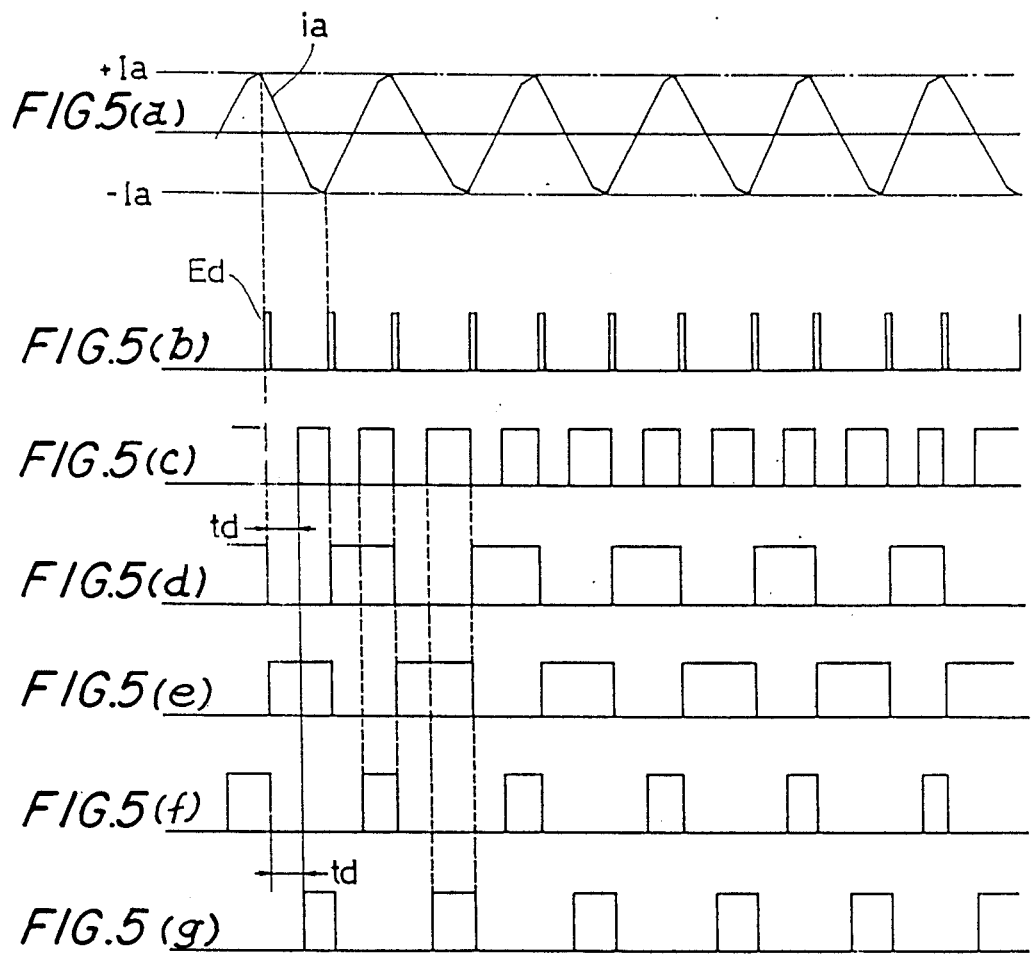
FIGS. 5a–5g are schematic diagrams showing the operation of the control circuit when the set welding current is small.

FIGS. 4 and 5 illustrate various waveforms (a)–(g) generated in the main control unit 4 shown in FIG. 3. In both FIGS. 4 and 5, waveform (a) shows a waveform of an actual welding current ia when a welding current Ia is set in the welding current setting device 10; waveform (b) shows an output waveform of the comparator 11; waveform (c) shows an output waveform of the turn-on and turn-off time setting circuit 13; waveform (d) shows an output waveform of the Q terminal of the flip-flop 12; waveform (e) shows an output waveform of the $\overline{Q}$ terminal of the flip-flop 12; waveform (f) shows an output waveform of terminal X of the AND gate 14 when the transistors Tr1 and Tr4 are turned on; and waveform (g) shows an output waveform of terminal Y of the AND gate 15 when the transistors Tr2 and Tr3 are turned on.

Basically, the resistance welder described above is operated as follows. The current from the ac power supply 8 is rectified by the full-wave rectifier circuit 1 and is inverted into ac power having different frequencies by the inverter 2. The ac power is fed to the primary coil of the welding transformer 3 to induce a secondary current at the secondary coil thereof. The secondary current is outputted to the guns 7 as a dc welding current rectified by the rectifier connected to the secondary coil of the welding transformer 2, so that the guns 7 will spot weld the workpiece 9.

Specifically, assuming that a welding current Ia, which is represented by $+$Ia and $-$Ia in FIGS. 4(a) and 5(a), is set in the welding current setting device 10, a signal voltage Es representative of the welding current Ia is outputted to the inverting terminal of the comparator 11, and a welding current ia flows in the main circuit of the welder. The current sensor 6 then produces a signal voltage Ew representative of the welding current ia and the signal voltage Ew is inputted to the non-inverting terminal of the comparator 11 through the magnetic saturation sensing circuit 5. The comparator 11 compares the signal voltage Es which corresponds to the welding current Ia with the signal voltage Ew which corresponds to the actual welding current ia, and when the actual welding current ia reaches the welding current Ia, the comparator 11 produces a signal Ed having a fixed voltage, as shown in FIGS. 4(b) and 5(b). The signal Ed of the comparator 11 is inputted to the input terminal T of the flip-flop 12 which produces flip-flop signals alternately on its Q and $\overline{Q}$ terminals, as shown in FIGS. 4(d) and 4(e) and FIGS. 5(d) and 5(e), respectively, and at the same time, the output signal of the comparator 11 is inputted to the turn-on and turn-off time setting circuit 13 to set a delay time td between the on time and the off time of the diagonally opposite transistors Tr1 and Tr4 or Tr3 and Tr2 of the inverter 2.

The AND gate 14 has two input terminals A and B, the terminal A receiving flip-flop signals on the Q terminal of the flip-flop 12, and the terminal B receiving a delay time signal from the turn-on and turn-off time setting circuit 13. Similarly, the AND gate 15 has two input terminals A' and B', the terminal A' receiving flip-flop signals on the $\overline{Q}$ terminal of the flip-flop 12, and the terminal B' receiving a delay time signal from the turn-on and turn-off time setting circuit 13.

Thus, when the delay time td is elapsed, as shown in FIGS. 4(d) and 4(e) and FIGS. 5(d) and 5(e), both the terminals A and B of the AND gate 14 or both the terminals A' and B' of the AND gate 15 become a logic 1 so as to produce a logic 1 signal on the output terminal X of the AND gate 14 or the output terminal Y of the AND gate 15, as shown in FIGS. 4(f) and 4(g) and FIGS 5(f) and 5(g). The logic 1 signal is inputted to the bases of the transistors Tr1 and Tr4 or Tr2 and Tr3 to conduct current from the rectifier circuit 1 to the transistors Tr1 and Tr4 or Tr2 and Tr3.

Figure 6:
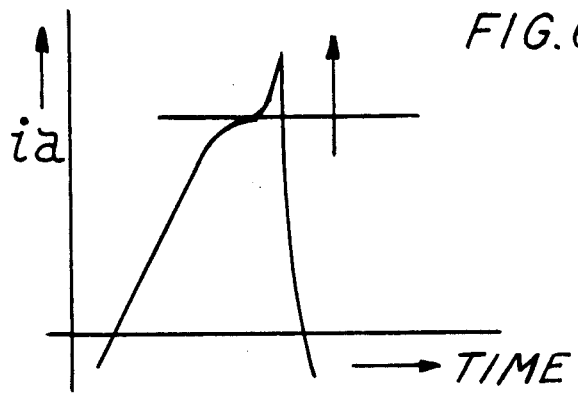
FIG. 6 is a schematic diagram showing the relation between the magnetic saturation and the exciting current.

The output current of the inverter 2 flows from one input terminal U through the primary coil of the welding transformer 3 to the other input terminal V. When the welding current ia flowing through the primary coil of the welding transformer 3 increases, and when the welding transformer 3 is brought close to a magnetically-saturated condition, exciting current rapidly begins to increase, as shown in FIG. 6. Then, the current sensor 6 outputs to the magnetic saturation sensing circuit 5 a sensing signal representative of the welding current ia, and the magnetic saturation sensing circuit 5 outputs a signal voltage Ew representative of the rapidly increasing welding current ia to the non-inverting terminal of the comparator 11. The comparator 11 compares the signal voltage Ew of the magnetic saturation sensing circuit 5 with the signal voltage Es representative of the welding current Ia inputted to the inverting terminal.

When the transistors Tr1 and Tr4 or Tr2 and Tr3 are switched into conduction, the output current of the inverter 2 flows from the input terminal V or U of the welding transformer 3 through its primary coil to the input terminal U or V.

Thus, when the welding current Ia set by the welding current setting device 10 is large (FIG. 4), the time until which the actual welding current ia reaches the set welding current Ia becomes longer due to impedance of the workpiece 9, and consequently, the output frequency of the inverter 2 becomes lower. Therefore, a large amount of current may be applied to the workpiece 9 without magnetically saturating the welding transformer 3. On the other hand, when the set welding current Ia is small (FIG. 5), the time until which the actual welding current reaches the set welding current Ia becomes shorter, and consequently, the output frequency of the inverter 2 becomes correspondingly higher. Therefore, even a small amount of current may be applied to the workpiece 9, using the welding transformer 3 efficiently in close proximity to magnetic saturation In summary, when the set welding current Ia is large, the welding transformer 3 is continuously driven at lower frequency to the extent that Its Iron core will not be saturated, and conversely, when the set welding current Ia is small, the welding transformer 3 is continuously driven at higher frequency.

Figure 7:
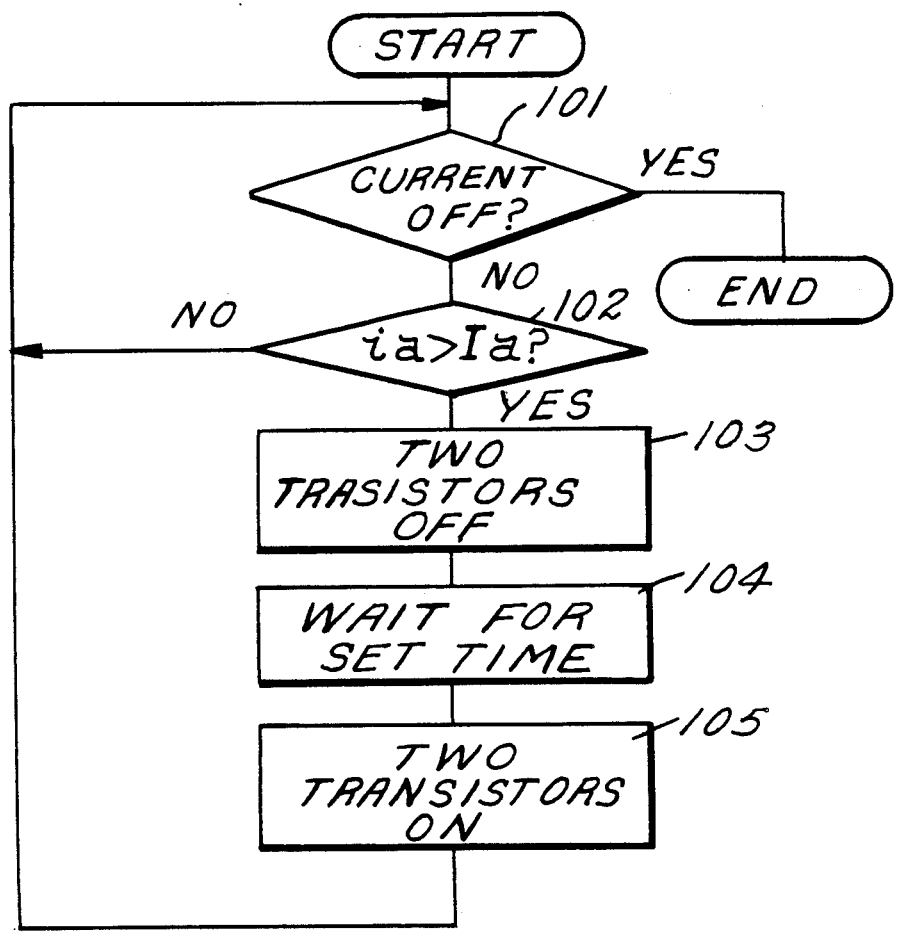
FIG. 7 is a flow chart of welding current control.

Although the frequency of welding current is controlled by the electrical circuit shown in FIG. 3, it can be controlled by a computer according to a flow chart shown in FIG. 7.

Specifically, when a welding current is supplied to the workpiece 9, the computer determines in Step 101 if the welding current has flowed for a predetermined period of time. When the welding current has not flowed, the computer determines in Step 102 if the actual welding current ia is greater than the welding current Ia set by the welding current setting device 10. When the actual welding current ia is less than the set welding current Ia, the welding current continues to flow until the actual welding current ia becomes greater than the set welding current Ia. Then, the computer turns off, in Step 103, one pair of the transistors Tr1, Tr4 and Tr2, Tr3 of the inverter 2. After a predetermined delay time has been elapsed in Step 104, the computer turns on, in Step 105, the other pair of the transistors Tr1, Tr4 and Tr2, Tr3. By repeating these operations, the welding transformer 3 is continuously driven at a frequency commensurate with the load impedance and to the extent that the iron core of the welding transformer 3 is not magnetically saturated. When the computer determines in Step 101 that the predetermined time for supplying welding current is reached, it stops supplying the welding current.

From the foregoing detailed description of the dc resistance welder, it can be appreciated that the welding current can flow to the welding transformer in close proximity to magnetic saturation of the iron core. Also, in the welding transformer design, the limitation on the frequency can be eliminated so that the maximum welding current and the weight which the workpiece requires may be realized in the priority design conditions. Thus, when the welding transformer is mounted on a welding robot for example, the design may readily be adapted to the varying weight of the robot, thereby providing a greater design flexibility. Further, unlike the pulse-width modulation (PWM) control, the operating frequency may be varied continuously, there being less voltage ripple. This results in improved weld quality.

While the invention has been described with reference to a preferred embodiment thereof, it is to be understood that modifications or variations may be easily made without departing from the spirit of this invention which is defined by the appended claims.

What is claimed is:

1. A dc resistance welder for welding workpieces, each said workpiece having an impedance defined by size and shape of said workpiece, said welder comprising:
   a first rectifier circuit for converting ac power into dc power;
   an inverter for converting the dc power into ac power having a variable frequency;
   a welding transformer connected to said inverter and outputting a current;
   means for welding the workpiece;
   a second rectifier circuit positioned between said transformer and said welding means, for rectifying the output current of said welding transformer and for supplying the output current as a welding current to said welding means;
   first means for setting a predetermined welding current in accordance with the impedance of the workpiece;
   second means for sensing an actual welding current for the purpose of sensing magnetic saturation of said welding transformer; and
   third means for comparing the welding current set by said first means with the actual welding current sensed by said second means and for varying the output frequency of said inverter by inverting the direction of the output current of said inverter when the actual welding current reaches the set predetermined welding current, said output current of the inverter flowing for a fixed predetermined time after the actual welding current reaches the set predetermined welding current and before inverting the direction.

2. The dc resistance welder as defined in claim 1 wherein said third means comprises a comparator having an inverting terminal connected to the output of said first means and a non-inverting terminal connected to the output of said second means.

* * * * *